(12) United States Patent
Hongu

(10) Patent No.: US 6,208,676 B1
(45) Date of Patent: Mar. 27, 2001

(54) GAS LASER OSCILLATOR

(75) Inventor: Hitoshi Hongu, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/340,996

(22) Filed: Jun. 28, 1999

(30) Foreign Application Priority Data

Jun. 26, 1998 (JP) .................................................. 10-180268

(51) Int. Cl.[7] ...................................................... H01S 3/03
(52) U.S. Cl. .............................. 372/61; 372/55; 372/29; 372/81; 372/34
(58) Field of Search .................................. 372/61, 55, 69, 372/58, 59, 81, 29, 34

(56) References Cited

U.S. PATENT DOCUMENTS

| | | | |
|---|---|---|---|
| 3,790,899 | 2/1974 | Dessus et al. | 372/61 |
| 4,351,052 | * 9/1982 | Sasaki et al. | 372/58 |
| 4,573,162 | * 2/1986 | Bakowsky et al. | 372/61 |
| 5,426,659 | * 6/1995 | Sugiyama et al. | 372/61 |
| 5,450,435 | * 9/1995 | Yamane et al. | 372/61 |

FOREIGN PATENT DOCUMENTS

| | | |
|---|---|---|
| 0 224 710 | 6/1987 | (EP) . |
| 0 429 652 | 6/1991 | (EP) . |
| 60-095984 | 5/1985 | (JP) . |
| 60-171777 | 9/1985 | (JP) . |
| 62-242377 | 10/1987 | (JP) . |

\* cited by examiner

Primary Examiner—Leon Scott, Jr.
(74) Attorney, Agent, or Firm—Ratner & Prestia

(57) ABSTRACT

The gas laser oscillator having metal housings disposed near internal mirrors of the resonator for covering, for example, the external of connecting tubes partially or totally, means for detecting the micro discharge current flowing inside of the connecting tubes near the internal mirrors of the resonator, and a control circuit for controlling energy to be supplied into discharge tubes by comparing output signals output from the means for detecting the micro discharge current with reference signals. The gas laser oscillator prevents the micro discharge current from flowing in laser gas inside of the connecting tubes, thereby preventing degradation of a total reflection mirror and a partial reflection mirror defining the internal mirrors of the resonator.

25 Claims, 8 Drawing Sheets

GAS LASER OSCILLATOR

FIELD OF THE INVENTION

The present invention relates to an axial flow gas laser oscillator of which axial directions of a discharge tube and a laser beam coincide with each other.

BACKGROUND OF THE INVENTION

A conventional axial flow gas laser oscillator is described hereinafter with reference to drawings. FIG. 10 shows a schematic diagram of the construction of a conventional gas laser oscillator. In FIG. 10, discharge tubes 1 are made of an insulator such as glass and have anodes 2 and cathodes 3 disposed in the interior thereof. High-voltage direct current or HVDC power supplies 4 are connected to the anodes 2 and the cathodes 3, and apply a voltage, for example 30KV, between the anodes 2 and the cathodes 3. Discharge spaces 5 exist within the discharge tubes 1 across the anodes 2 and the cathodes 3. Connecting tubes S are made of an insulator such as glass and a total reflection mirror 6 and a partial reflection mirror 7 are connected to the discharge tubes 1 on the cathodes 3 side via the connecting tubes 8. A laser beam 9 (an arrow) is output from the partial reflection mirror 7. The other arrows 10 indicate the flow direction of the laser gas circulating within the axial flow gas laser oscillator. A blower 11 forces the laser gas to flow in the axial direction of the discharge tubes 1. Heat exchangers 12 cool the laser gas which has been warmed up by an electric discharge in the discharge spaces 5 and the blower 11. The blower 11 effects a flow speed of the gas of approximately 200 m/sec in the discharge spaces 5. A gas outlet pipe 13 made of an insulator exhausts the laser gas from the anodes 2 side of the discharge tubes 1, and forms a part of a circulation route of the laser gas. Gas inlet pipes 14 made of an insulator supplies the laser gas from the cathodes 3 side of the discharge tubes 1, and form a part of the circulation route of the laser gas. The anodes 2 are disposed in the center of a resonator and is applied with a high voltage. The cathodes 3 are disposed, one on each end of the resonator without being grounded, so as to maintain the balance of the discharge current of a plurality of discharge tubes. As a result, the potential of the cathodes 3 is constantly high during operation. Therefore, an electrical insulation distance in a laser gas atmosphere must be maintained between the cathodes 3 and grounded heat exchangers 12 as well as between the cathodes 3 and the total reflection mirror 6 and the partial reflection mirror 7. To secure this, a gas outlet pipe 13 and gas inlet pipes 14, both made of an insulator are disposed between the cathodes 3 and the heat exchangers 12, and connecting tubes 8 also made of an insulator is disposed between the cathodes 3 and total reflection mirror 6 and partial reflection mirror 7.

The construction of the conventional axial flow gas laser oscillator has been described above.

Next, the operation of the conventional axial flow gas laser oscillator is described.

A high voltage is supplied across the anodes 2 and cathodes 3 by the HVDC power supplies 4 to generate a glow-discharge in the discharge spaces 5. The laser gas flowing through the discharge spaces 5 gets excited by gaining this discharge energy. The excited laser gas then is optically resonated by an optical resonator comprising the total reflection mirror 6 and partial reflection mirror 7, and the laser beam 9 is output from the partial reflection mirror 7. The laser beam 9 is used for a wide range of laser beam machining applications.

With the construction described above, if the discharge is continued after impurities have been introduced into the laser gas flowing in the discharge tubes 1 or gas mixing ratio has been changed, the discharge in the discharge tubes 1 becomes unstable, resulting in wide fluctuation of the potential of the cathodes 3. A fluctuation in the potential of the cathodes 3 allows a micro discharge current to flow in the laser gas inside the connecting tubes 8 thereby degrading the total reflection mirror 6 and the partial reflection mirror 7 employed as internal mirrors of the resonator.

The present invention aims at solving the problem mentioned above and to provide a gas laser oscillator which realizes a stable laser beam mode and laser output for a long time.

SUMMARY OF THE INVENTION

The gas laser oscillator of the present invention comprises such elements as: discharge tubes; power supplies for supplying energy to the discharge tubes; internal mirrors of the resonator disposed in the discharge tubes; detecting means for detecting at least one of a micro discharge current flowing near the internal mirrors of the resonator and the physical phenomenon generated by the micro discharge current; a control circuit for controlling the energy to be supplied to the discharge tubes by responding to the output signals output from the detecting means.

According to the gas laser oscillator of the present invention, the energy to be input into the discharge tubes can be controlled by the control circuit by comparing the output signals output from the detecting means with reference signals. Therefore, the occurrence of the micro discharge current can be restricted, which in turn, prevents the degradation of the internal mirrors of the resonator caused by the micro discharge current.

DESCRIPTION OF THE EXEMPLARY EMBODIMENTS

The exemplary embodiments of the present invention are described hereinafter.

First Exemplary Embodiment

A gas laser oscillator according to the first exemplary embodiment of the present invention is described hereinafter, with reference to the drawings.

Figure 1:
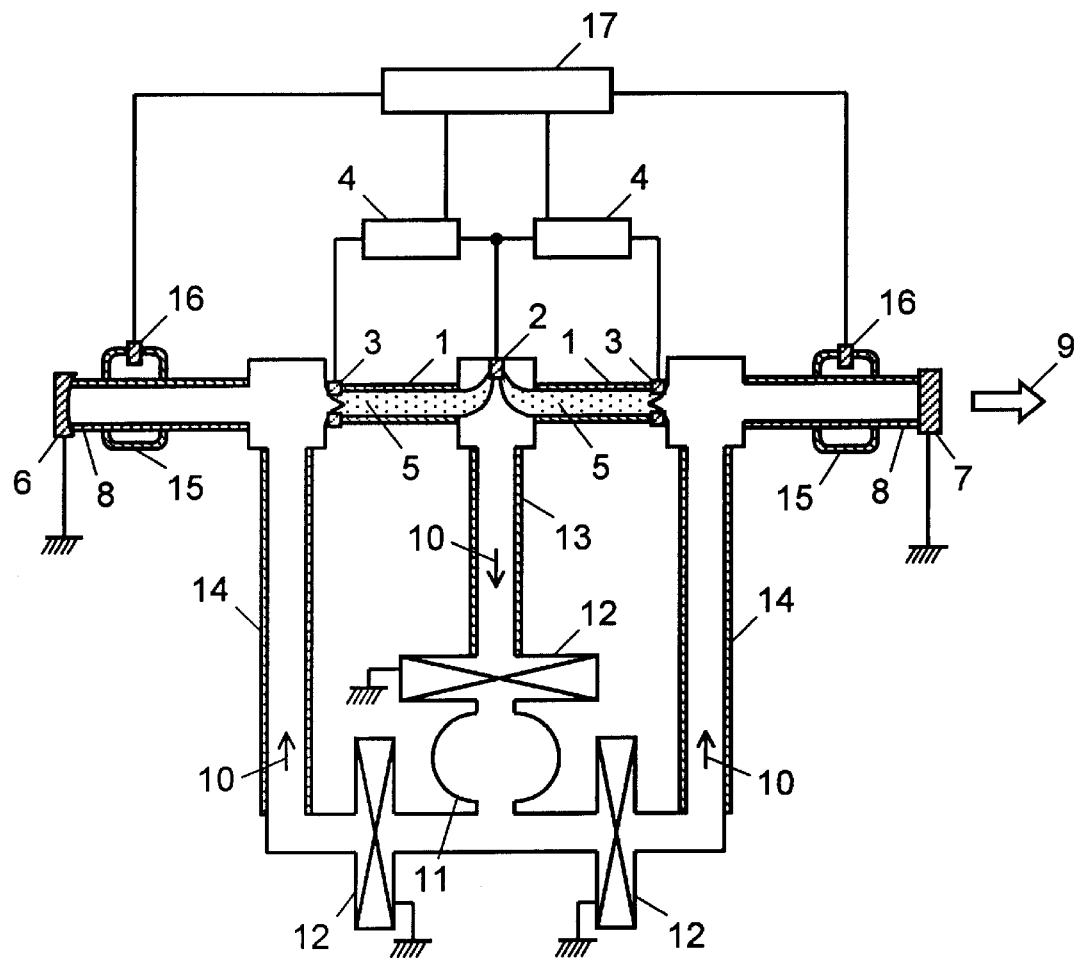
FIG. 1 shows a schematic diagram illustrating the construction of the gas laser oscillator according to the first embodiment of the present invention.

FIG. 1 shows a schematic diagram illustrating the construction of the embodiment. The same numerals are given to the elements which have appeared in the description of the conventional gas laser oscillator.

In FIG. 1, the discharge tubes 1 are made of an insulator such as glass and have the anodes 2 and the cathodes 3 disposed in the interior thereof. The high-voltage direct current or HVDC power supplies 4 are connected to the anodes 2 and cathodes 3, and are applying a voltage of, for example, 30KV across the anodes 2 and cathodes 3, thereby supplying energy to the inside of the discharge tubes 1. The discharge spaces 5 exist inside of the discharge tubes 1 between the anodes 2 and the cathodes 3. The total reflection mirror 6 and partial reflection mirror 7 define the internal mirrors of the resonator. The connecting tubes 8 are made of an insulator such as glass, and through which the total reflection mirror 6 and the partial reflection mirror 7 are connected to the discharge tubes 1 on the cathodes 3 side. The laser beam 9 is output from the partial reflection mirror 7. The arrows 10 indicate the flow direction of the laser gas circulating within the axial flow gas laser oscillator. The blower 11 is for forcing the laser gas to flow along the axial direction of the discharge tube 1. The heat exchangers 12 are for cooling the laser gas which has been warmed up by an electric discharge in the discharge spaces 5 and the blower 11. The blower 11 effects a flow speed of the gas of approximately 200 m/sec in the discharge spaces 5. The gas outlet pipe 13 made of an insulator is for exhausting the laser gas from the anodes 2 side of the discharge tubes 1, and is partially forming a circulation route of the laser gas. The gas inlet pipes 14 made of an insulator are for supplying the laser gas from the cathodes 3 side of the discharge tubes 1, and partially forming a circulation route of the laser gas. Metal housings 15 are for covering partially or totally the exterior of the connecting tubes 8 near the internal mirrors 6 and 7 of the resonator. Sensors 16 detect electromagnetic waves inside the metal housing 15 generated by the micro discharge current flowing in the connecting tubes 8. The control circuit 17 compares output signals sent from the sensors 16 with the reference signals and restricts the discharge energy to be supplied to the discharge tubes 1.

The operation of the aforementioned construction is described hereinafter. A high voltage is applied across the anodes 2 and cathodes 3 by the HVDC power supplies 4 to generate glow-discharge in the discharge spaces 5. The laser gas passing through the discharge spaces 5 gains this discharge energy and gets exited. The excited laser gas turns to be optically resonated by the optical resonator comprising the total reflection mirror 6 and partial reflection mirror 7, and then the partial reflection mirror 7 outputs the laser beam 9. The laser beam 9 is used for a wide range of laser beam machining applications.

With the gas laser oscillator described above, the discharge in the discharge tubes 1 becomes unstable leading the potential of the cathodes 3 to fluctuate widely if the discharge is continued after impurities have been introduced into the laser gas flowing in the discharge tubes 1 or gas mixing ratio has been changed. The wide fluctuation of the potential of the cathodes 3 result in the micro discharge current in the laser gas inside the connecting tubes 8. The electromagnetic waves generated by the micro discharge current are detected by the sensors 16. The metal housings 15 efficiently contain the electromagnetic waves generated by the micro discharge current, and blocks external noise, thereby helping the sensors 16 detect the electromagnetic waves precisely. The control circuit 17 compares the output signals from the sensors 16 with the reference signals. If the output signals from the sensors 16 are larger than the reference signals, the control circuit 17 reduces or stops the discharge energy supplied from the HVDC power supplies 4 in order to suppress the micro discharge current flowing in the connecting tubes 8. By controlling the discharge energy supplied from the HVDC power supplies 4 in a manner described above, the degradation of the internal mirrors of the resonator caused by the micro discharge current can be prevented.

Figure 2:
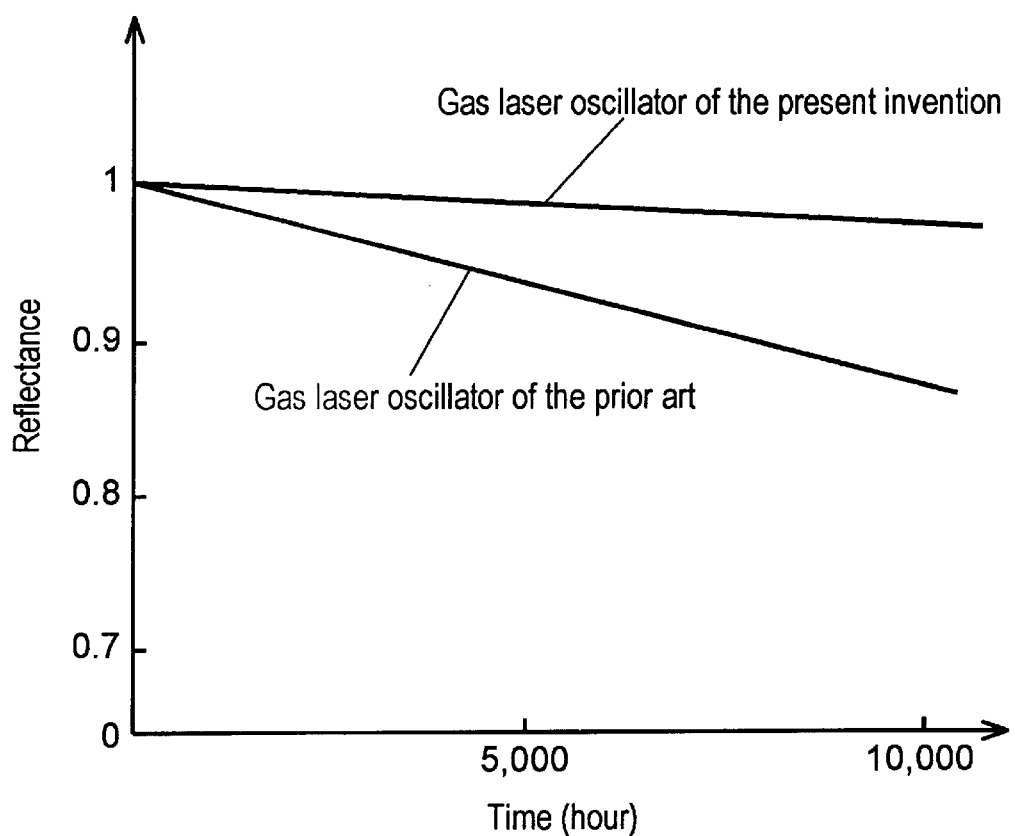
FIG. 2 is a graph showing degradation versus time of the internal mirrors of the resonator, due to impurities introduced into the laser gas of the conventional gas laser oscillator.

FIG. 2 is a chart showing aging degradation of the internal mirrors of the resonator, due to impurities introduced into the laser gas. Reflectance is adopted as a measure to show the degradation level of the internal mirrors of the resonator. As FIG. 2 shows, according to the present invention, the reflectance of the internal mirrors of the resonator changes little, thus degradation can be restricted for a long time.

Second Exemplary Embodiment

The gas laser oscillator in accordance with the second exemplary embodiment of the present invention is described hereinafter, with reference to the drawings.

Figure 3:
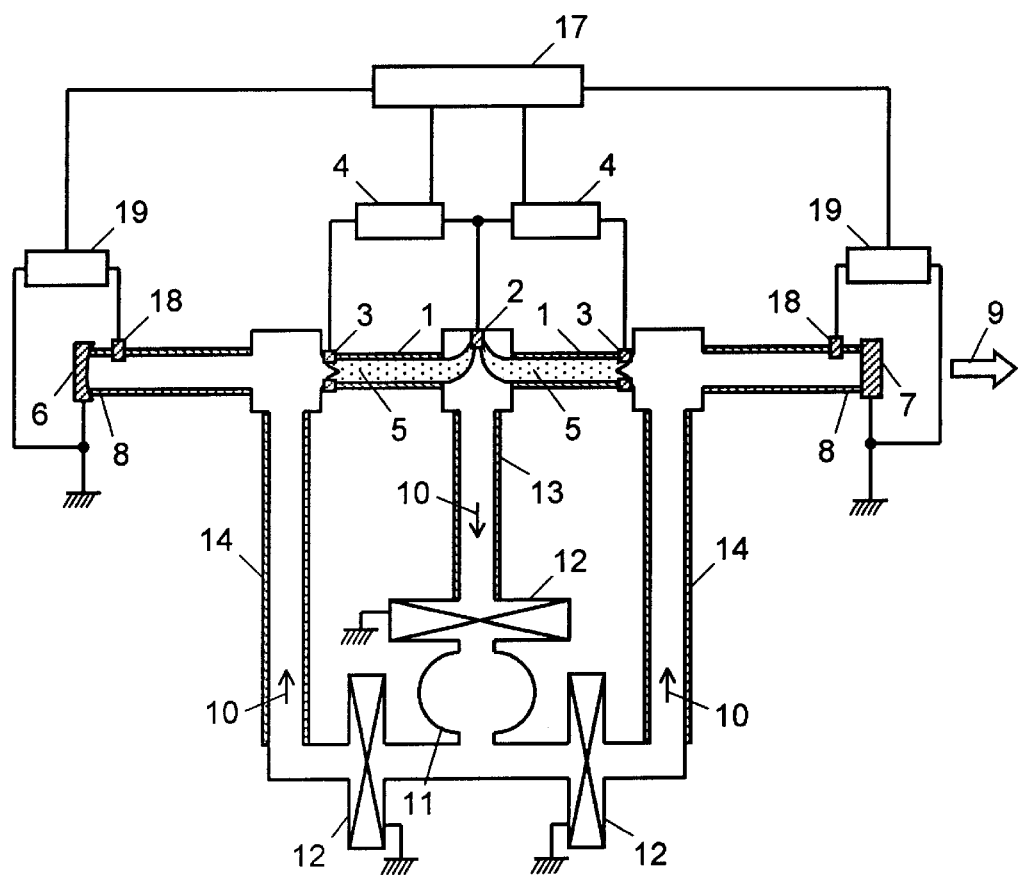
FIG. 3 shows a schematic diagram illustrating the construction of the gas laser oscillator according to the second embodiment of the present invention.

FIG. 3 shows a schematic diagram illustrating the construction of the embodiment. The same elements in FIGS. 1 and 3 carry the same reference numbers, and the description for their operation is omitted. In FIG. 3, electrodes 18 are for catching the micro discharge current flowing through the connecting tubes 8. Current detectors 19 are for converting the trapped micro discharge current into output signals and are disposed between the electrodes 18 and the ground potential. The current detectors 19 transmit the micro discharge current trapped by the electrodes 18 to the ground potential points via resistors. The quantity of the micro discharge current can be measured by a voltage drop through the resistors. An alternative detection method uses current transformers (CT) to the route of the micro discharge current trapped by the electrodes 18 to the ground potential points. In this way, the level of the micro discharge current is measured as changes in current levels. In such a manner, the micro discharge current flowing in the connecting tubes 8 is trapped by the electrodes 18 and output from the current detectors 19 as output signals. The control circuit 17 compares the output signals from the current detectors 19 with the reference signals. Then, if the output signals from the current detectors 19 are larger than the reference signals, the control circuit 17 reduces or stops the discharge energy supplied from the HVDC power supplies 4.

As described above, according to the gas laser oscillator of the present embodiment, undesirable influence on the internal mirrors of the resonator can be restricted by converging the micro discharge current to the electrodes 18 distal to the internal mirrors of the resonator. The degradation of the internal mirrors of the resonator can also be prevented by restricting the micro discharge current by reducing or stopping the discharge energy supplied from the HVDC power supplies 4. FIG. 2 shows the effect of the gas laser oscillator of this embodiment.

Third Exemplary Embodiment

The gas laser oscillator in accordance with the third exemplary embodiment of the present invention is described hereinafter, with reference to the drawings.

Figure 4:
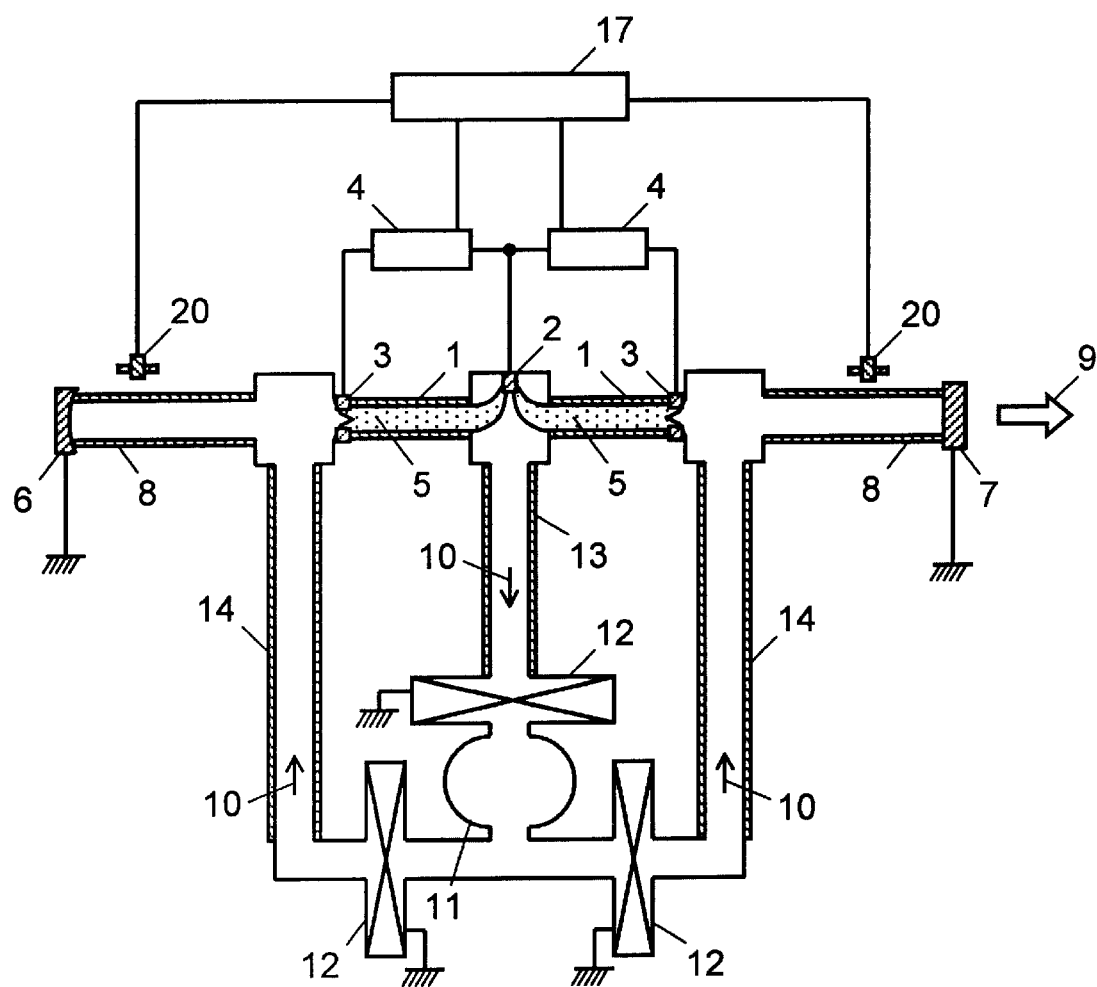
FIG. 4 shows a schematic diagram illustrating the construction of the gas laser oscillator according to the third embodiment of the present invention.

FIG. 4 shows a schematic diagram illustrating the construction of the gas laser oscillator of this embodiment.

The elements appeared in FIG. 1 carry the same reference numbers, and the explanation for the basic operation is omitted. In FIG. 4, optical sensors 20 preferably made of PIN photo diode are used for trapping visible lights generated by the micro discharge current flowing in the connecting tubes 8. The optical sensors 20 are electrically isolated from the inside of the connecting tubes 8. The optical sensors 20 trap the visible lights generated by the micro discharge current, which are then output as output signals. The control circuit 17 compares the output signals sent from the optical sensors 20 with the reference signals. If the output signals from the optical sensors 20 are larger than the reference signals, the control circuit 17 reduces or stops the discharge energy supplied from the HVDC power supplies 4 to restrict the micro discharge current flowing in the connecting tubes 8.

According to the gas laser oscillator of the present embodiment, the degradation of the internal mirrors of the resonator can be prevented by restricting the micro discharge current by controlling the discharge energy supplied from the HVDC power supplies 4. FIG. 2 shows the effect of the gas laser oscillator of this embodiment.

Fourth Exemplary Embodiment

The gas laser oscillator in accordance with the fourth exemplary embodiment of the present invention is described hereinafter, with reference to the drawings.

Figure 5:
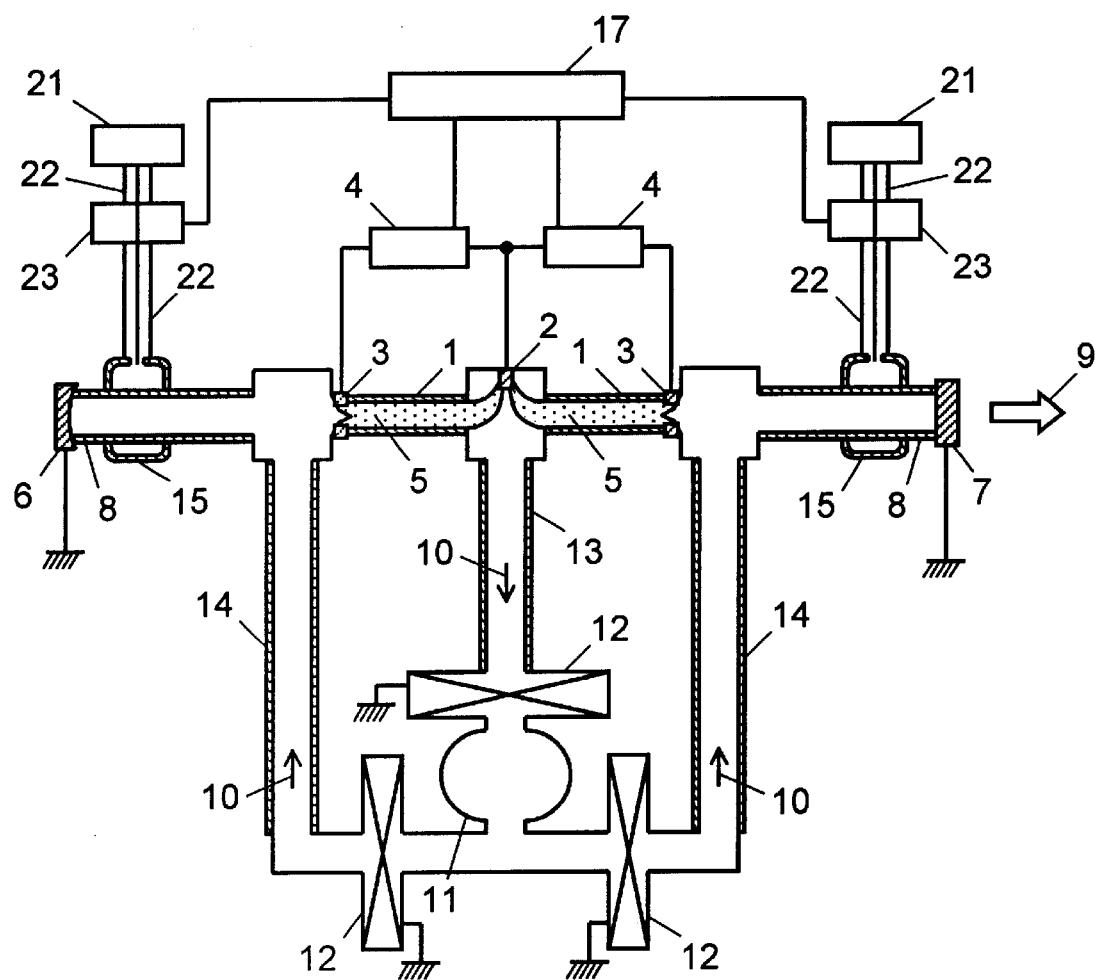
FIG. 5 shows a schematic diagram illustrating the construction of the gas laser oscillator according to the fourth embodiment of the present invention.

FIG. 5 shows a schematic diagram illustrating the construction of the gas laser oscillator of this embodiment.

The elements appeared in FIG. 1 carry the same reference numbers, and the description for the basic operation is omitted. In FIG. 5, high frequency power supplies 21 are for generating high frequency signals. Coaxial cables 22 are for transmitting the high frequency signals from the high frequency power supplies 21 to the inside of the metal housings 15. Reflected wave detectors 23 are for detecting reflected waves returning to the high frequency power supplies 21 from the metal housings 15 via the coaxial cables 22 upon occurrence of the micro discharge current in the connecting tubes 8.

According to this embodiment, high frequency signals are constantly transmitted from the high frequency power supplies 21 to the metal housings 15 via the coaxial cables 22 as long as the laser is being oscillated. When the discharge current flows within the connecting tubes 8, the high frequency signals partially return to the high frequency power supplies 21 as reflected waves due to the impedance change within the metal housings 15 even if it is a minimum level. The reflected wave detector 23 detect the reflected waves and output detection signals responsive to the magnitude of the reflected waves. The control circuit 17 compares the detection signals sent from the reflected wave detector 23 with the reference signals. If the detection signals from the reflected wave detector 23 are larger than the reference signals, the control circuit 17 reduces or stops the discharge energy output from the HVDC power supplies 4 to restrict the micro discharge current flowing in the connecting tubes 8.

As has been described above, according to the gas laser oscillator of the present embodiment, even a minor discharge current flowing in the connecting tubes can be detected. Therefore, the discharge energy can be controlled even during a low power level oscillation and the degradation of the internal mirrors of the resonator can be prevented. The effect of the gas laser oscillator of this embodiment is shown in FIG. 2.

Fifth Exemplary Embodiment

The gas laser oscillator in accordance with the fifth exemplary embodiment of the present invention is described hereinafter, with reference to drawings.

Figure 6:
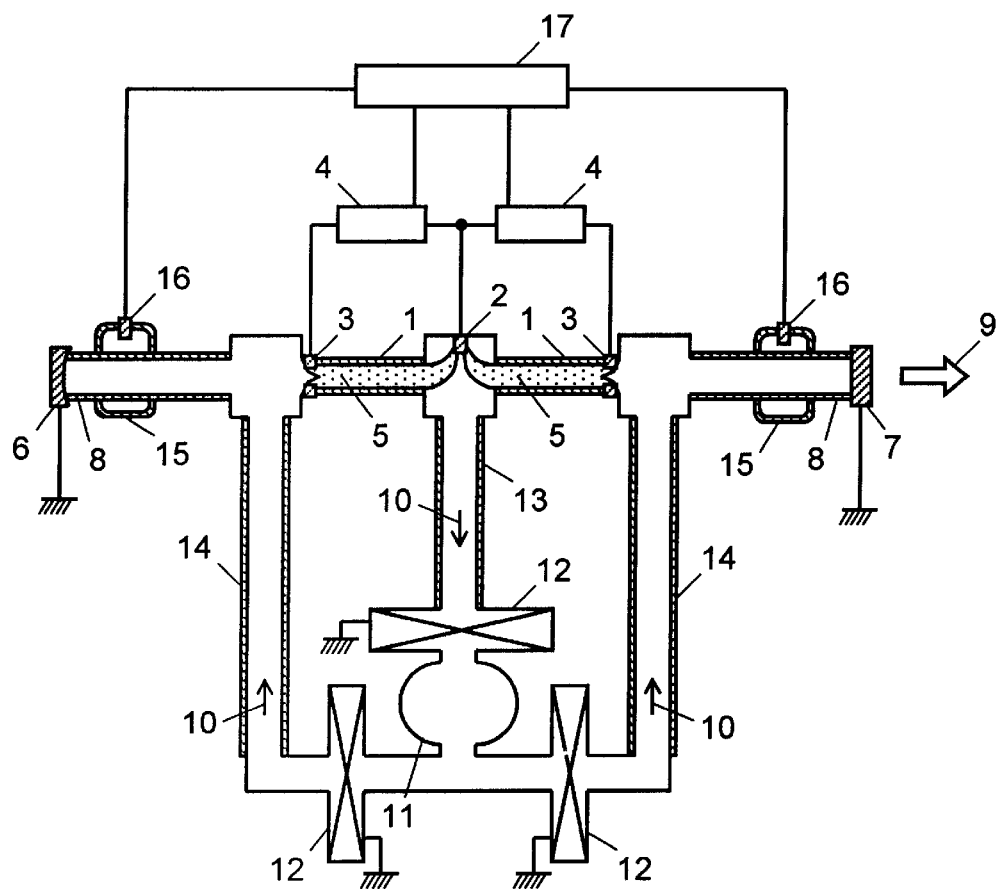
FIG. 6 shows a schematic diagram illustrating the construction of the gas laser oscillator according to the fifth and sixth embodiments of the present invention.

FIG. 6 shows a schematic diagram illustrating the construction of the gas laser oscillator of this embodiment.

Figure 8A:
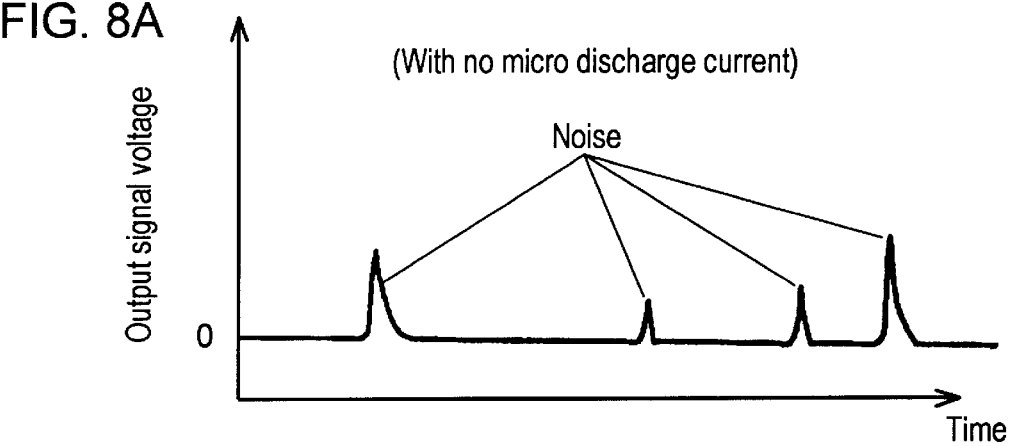
FIGS. 8A, 8B show waveform charts illustrating examples of the output signal waveforms when the sensors detect the micro discharge current generated in the connection tubes of the gas laser oscillator according to the fifth and sixth embodiments of the present invention.
Figure 8B:
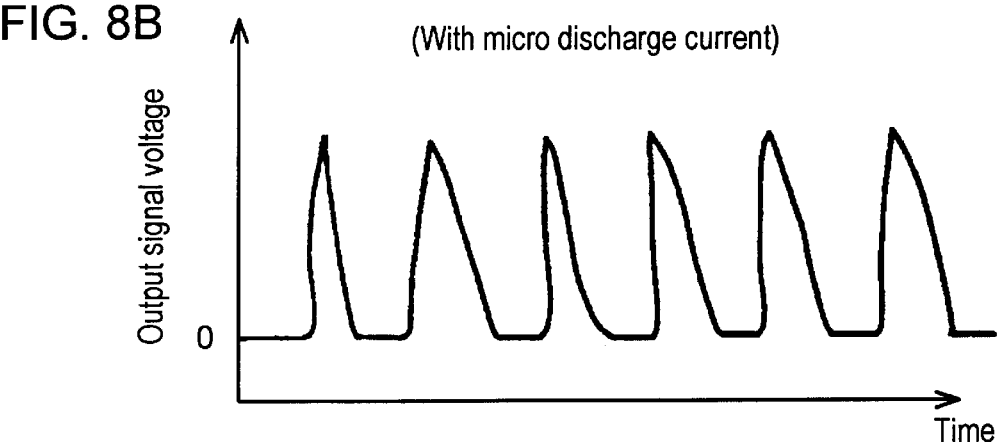

The elements appeared in FIG. 1 carry the same reference numbers, and the description for the basic operation is omitted. In FIG. 6, the micro discharge current generated within the connecting tubes 8 is detected by the sensors 16 which ouput the detected signals to the control circuit 17. Examples of the waveforms of the output signals of the sensors 16 are shown in FIGS. 8A and 8B. In FIGS. 8A and 8B, the horizontal axis shows time while the vertical axis shows output signal voltages. When the micro discharge current occurs, a output signal waveform appears intermittently in the output of the sensors 16 as shown in FIG. 8B. Such waveform is not observed in the chart showing normal operating conditions. The chart for normal operating conditions sometimes shows a noise waveform as shown in FIG. 8A. The chart shows a particular waveform as seen in FIG. 8B when the micro discharge current occurs. In order to avoid misinterpreting the noise waveform shown in FIG. 8A as the detection signal waveform for the micro discharge current shown in FIG. 8B, the area of the output signal waveform is integrated for a predetermined period. Based on the evaluated integrated value, the detection signal waveform for the micro discharge current is distinguished from the noise waveform generated under normal operating conditions. When the control circuit 17 judges, based on the waveform output by the sensors 16, that the micro discharge current is occurring, it reduces or stops the discharge energy supplied from the HVDC power supplies 4 to restrict the micro discharge current flowing in the connecting tubes 8.

Figure 7:
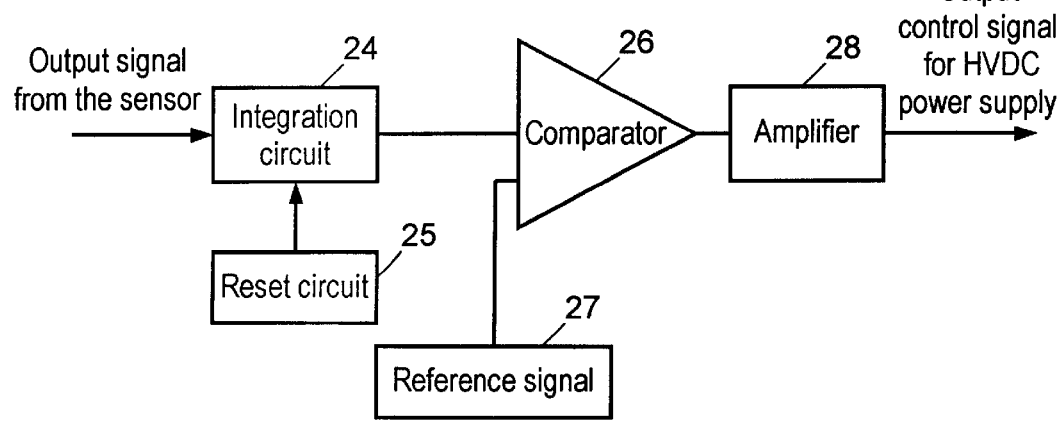
FIG. 7 shows a block diagram illustrating a control circuit according to the fifth embodiment of the present invention.

FIG. 7 shows a block diagram illustrating an example of the circuit configuration of the control circuit 17. Referring to FIG. 7, an integration circuit 24 integrates the detection signals of the sensors 16 for a predetermined period. A reset circuit 25 resets the integration circuit which has conducted the integration for a predetermined period. A comparator 26 compares an integrated value evaluated by the integration circuit 24 and reference signals 27. An amplifier 28 outputs signals which control the HVDC power supplies 4 responding to the output from the comparator 26.

Using such control circuit prevents a failure in control caused by an influence of a noise and the like, and enables a precise control of the discharge energy. As a result, the degradation of the internal mirrors of the resonator can be prevented. The effect of the gas laser oscillator of this embodiment is shown in FIG. 2.

Sixth Exemplary Embodiment

The gas laser oscillator in accordance with the sixth exemplary embodiment of the present invention is described hereinafter, with reference to drawings.

FIG. 6 shows a schematic diagram illustrating the construction of the gas laser oscillator of this embodiment.

The elements appeared in FIG. 1 carry the same reference numbers, and the explanation for the basic operation is omitted. Referring to FIG. 6, the micro discharge current generated within the connecting tubes 8 are detected by the sensors 16 which output the detected signals to the control circuit 17. Examples of the waveforms of the output signals of the sensors 16 are shown in FIGS. 8A and 8B. In FIGS. 8A and 8B, the horizontal axis shows time while the vertical axis shows output signal voltages. When the micro discharge current occurs, a output signal waveform appears intermittently in the output of the sensors 16 as shown in FIG. 8B, which is not observed in the chart showing normal operating conditions. A noise waveform sometimes appears in the output signals under the normal operating conditions. In order to avoid misinterpreting the noise waveform as the detection signals waveform for the micro discharge current, the number of the occurrence of the output signal waveform is summed for a predetermined period. Based on the value of the evaluated summation, the detection signal waveform for the micro discharge current is distinguished from the noise waveform generated under normal operating conditions. When the control circuit 17 judges, based on the waveform output by the sensors 16, that the micro discharge current is occurring, it reduces or stops the discharge energy supplied from the HVDC power supplies 4 to restrict the micro discharge current flowing in the connecting tubes 8.

Figure 9:
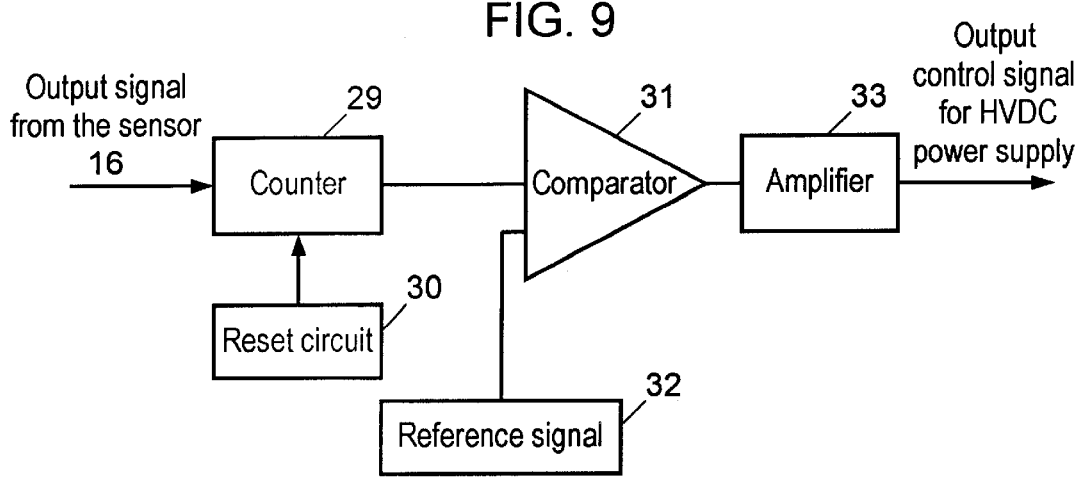
FIG. 9 shows a block diagram illustrating a control circuit used in the gas laser oscillator according to the sixth embodiment of the present invention.
Figure 10:
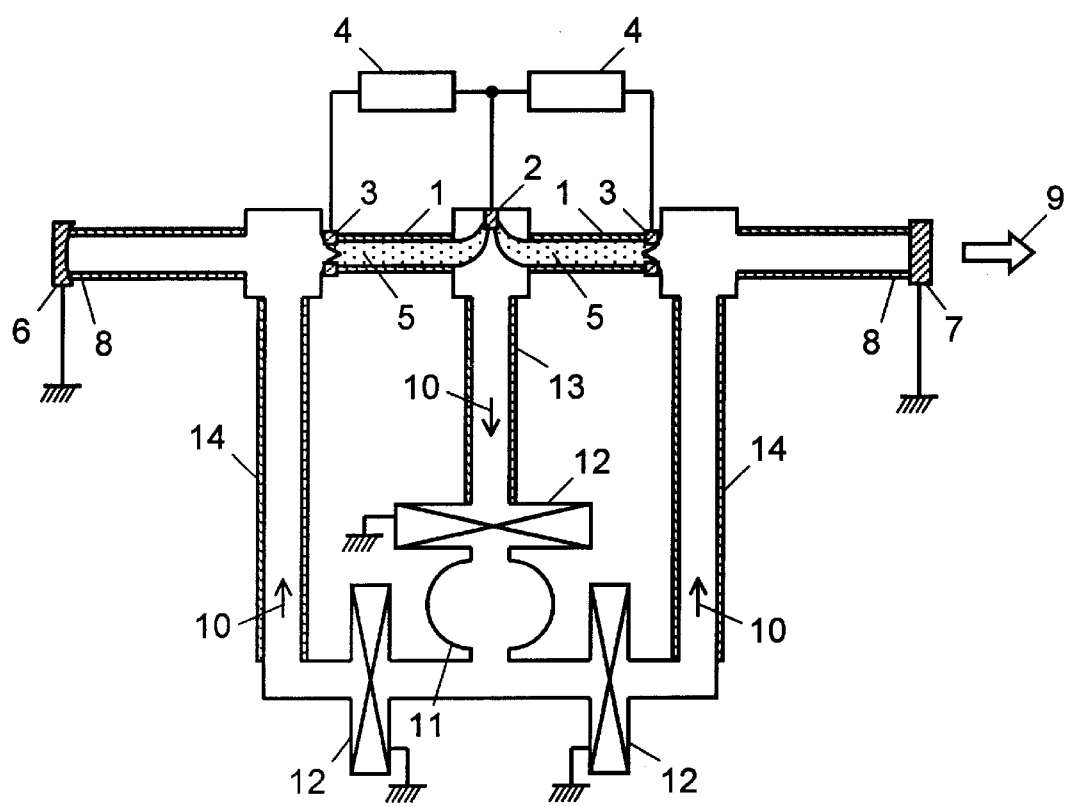
FIG. 10 shows a schematic diagram illustrating the construction of the conventional gas laser oscillator.

FIG. 9 shows a block diagram illustrating an example of the circuit configuration of the control circuit 17. Referring to FIG. 9, a counter 29 counts the number of the occurrence of the detection signals, namely, the appearance of the output signal waveform output from the sensors 16 for a predetermined period. A reset circuit 30 resets the counter which has conducted the summation for a predetermined period. A comparator 31 compares a value measured by the counter 29 and reference signals 32. An amplifier 33 outputs signals which control the HVDC power supplies 4 responding to the output from the comparator 31.

Using such control circuit prevents a failure in control caused by an influence of a noise and the like, and enables a precise control of the discharge energy. As a result, the degradation of the internal mirrors of the resonator can be prevented. The effect of the gas laser oscillator of this embodiment is shown in FIG. 2.

As has been made clear, the gas laser oscillator of the present invention restricts the micro discharge current which is generated when impurities are introduced into the laser gas or gas mixing ratio is changed, by precisely detecting the micro discharge current flowing in the laser gas in the connecting tubes and by reducing or stopping the discharge energy. As the degradation of the internal mirrors of the resonator caused by the occurrence of the micro discharge current is precluded, a highly reliable gas laser oscillator which enables a stable laser beam machining can be provided.

The descriptions of the exemplary embodiments of the present invention has shown a plurality of methods for detecting the micro discharge current flowing in the laser gas. Also described was a plurality of methods for detecting physical phenomenon coinciding with the occurrence of the micro discharge current. However, it is to be understood that foregoing are only exemplary embodiments and detection methods are not limited to those. In addition, the detection precision can be further improved by combining a plurality of those methods. Therefore, various changes which are resorted to without departing from the spirit and the scope of the present invention are construed to be embraced by the accompanying claims.

What is claimed is:

1. A gas laser oscillator comprising:

discharge tubes;

a gas disposed within said discharge tubes;

at least one power supply supplying energy for exciting said gas to said discharge tubes;

a resonator comprising resonator mirrors and said discharge tubes;

detecting means for detecting a presence of a micro discharge current flowing near said resonator mirrors, the detecting means for generating output signals responsive to detection of said presence of said current by said detecting means; and a control circuit controlling energy from said power supplies to said discharge tubes, said circuit being responsive to said output signals from said detecting means.

2. The gas laser oscillator as set forth in claim 1 comprising:

said discharge tubes having laser gas therein;

housings covering an exterior of said resonator near said mirrors;

sensors for detecting electromagnetic waves generated by the micro discharge current flowing near said mirrors, the sensors providing output signals responsive to detecting said electromagnetic waves; and said control circuit controlling the energy from said power supplies to said discharge tubes by comparing said output signals from said sensors with reference signals.

3. The gas laser oscillator as set forth in claim 1 comprising:

said discharge tubes having laser gas therein;

detection electrodes conducting current from a micro discharge current flowing in laser gas near said mirrors;

current detectors connected to said electrodes; and said control circuit controlling the energy from said power supplies to said discharge tubes based on said output signals from said current detectors.

4. The gas laser oscillator as set forth in claim 3, wherein resistors or current transformers are said current detectors.

5. The gas laser oscillator as set forth in claim 1 comprising:

said discharge tubes having laser gas therein;

optical sensors detecting light generated by the micro discharge current flowing near said mirrors; and said control circuit controlling the energy from said power supplies to said discharge tubes based on said output signals from said optical sensors.

6. The gas laser oscillator as set forth in claim 5, wherein PIN photo diodes are said optical sensors.

7. The gas laser oscillator as set forth in claim 1 comprising:

said discharge tubes having laser gas therein;

housings at least partially covering an exterior of said resonator near said mirrors;

high frequency power supplies generating high frequency signals;

coaxial cables transmitting the high frequency signals from said high frequency power supplies to said housings;

reflected wave detectors detecting reflected waves returning from said housings to said high frequency power supplies via said coaxial cables; and said control circuit controlling the energy from said power supplies to said discharge tubes based on said output signals from said reflected wave detectors.

8. The gas laser oscillator as set forth in claim 1 comprising:

said discharge tubes having laser gas therein;

said control circuit for controlling the energy from said power supplies to said discharge tubes by being responsive to an integrated value, said integrated value obtained by integrating said output signal.

9. The gas laser oscillator as set forth in claim 1 comprising:

said discharge tubes having laser gas therein;

said control circuit controlling the energy from said power supplies to said discharge tubes by being responsive to a sum, said sum obtained by summing, for a predetermined period, a number of occurrences of the micro discharge current flowing near said mirrors.

10. The gas laser oscillator as set forth in claim 1 comprising:

said discharge tubes made of an insulator;

said mirrors including a total reflection mirror and a partial reflection mirror, said partial reflection mirror being an output mirror;

connecting tubes connecting with said discharge tubes, said mirrors disposed in said connecting tubes;

housings covering an exterior of said connecting tubes;

sensors detecting electromagnetic waves generated by micro discharge current flowing in said connecting tubes; and said control circuit for controlling the energy from said power supplies to said discharge tubes based on said output signals from said sensors.

11. The gas laser oscillator as set forth in claim 1 comprising:

said discharge tubes being insulator discharge tubes;

said mirrors including a total reflection mirror and a partial reflection mirror, said partial reflection mirror being an output mirror;

connecting tubes connecting with said discharge tubes, said mirrors disposed in said connecting tubes;

detection electrodes conducting current from a micro discharge current flowing near said mirrors in said connecting tubes;

current detectors connected to said electrodes; and said control circuit for controlling the energy from said power supplies to said discharge tubes based on said output signals from said current detectors.

12. The gas laser oscillator as set forth in claim 11, wherein said current detectors are one of resistors and current transformers.

13. The gas laser oscillator as set forth in claim 1 comprising:

said discharge tubes being insulator discharge tubes;

said mirrors including a total reflection mirror and a partial reflection mirror, said partial reflection mirror being an output mirror;

connecting tubes connecting said discharge tubes with said mirrors of the resonator;

optical sensors detecting light generated by the micro discharge current flowing near mirrors; and said control circuit controlling the energy from said power supplies to said discharge tubes based on said output signals from said optical sensors.

14. The gas laser oscillator as set forth in claim 13, wherein PIN photo diodes are said optical sensors.

15. The gas laser oscillator as set forth in claim 1 comprising:

said discharge tubes being insulator discharge tubes;

said mirrors including a total reflection mirror and a partial reflection mirror, said partial reflection mirror being an output mirror;

connecting tubes connecting with said discharge tubes, said mirrors disposed in said connecting tubes;

housings at least partially covering an exterior of said connecting tubes;

high frequency power supplies generating high frequency signals;

coaxial cables transmitting the high frequency signals from said high frequency power supplies to said housings;

reflected wave detectors detecting reflected waves returning from said housings to said high frequency power supplies via said coaxial cables; and said control circuit controlling the energy from said power supplies to said discharge tubes based on said the output signals from said reflected wave detectors.

16. The gas laser oscillator as set forth in claim 1 comprising:

said discharge tubes being insulator discharge tubes;

said mirrors including a total reflection mirror and a partial reflection mirror, said partial reflection mirror being an output mirror;

connecting tubes connecting with said discharge tubes, said mirrors disposed in said connecting tubes;

a said control circuit controlling the energy from said power supplies to said discharge tubes by being responsive to an integrated value, said integrated value obtained by integrating said output signal.

17. The gas laser oscillator as set forth in claim 1 comprising:

said discharge tubes being insulator discharge tubes;

said mirrors including a total reflection mirror and a partial reflection mirror, said partial reflection mirror being an output mirror;

connecting tubes connecting with said discharge tubes, said mirrors disposed in said connecting tubes;

said control circuit controlling the energy from said power supplies to said discharge tubes by being responsive to a sum, said sum obtained by summing, for a predetermined period, a number of occurrences of micro discharge current flowing in said connecting tubes.

18. The gas laser oscillator as set forth in claim 1 comprising:

at least one of said discharge tubes being insulator discharge tubes;

a plurality of pairs of electrodes, each pair including an anode and a cathode disposed at opposite ends of said discharge tubes;

high-voltage direct current power supplies supplying high voltages to said pairs of electrodes;

said mirrors including a total reflection mirror and a partial reflection mirror, said partial reflection mirror being an output mirror;

a blower axially circulating laser gas in said discharge tubes;

heat exchangers for cooling the laser gas;

a gas outlet pipe providing a circulation route to exhaust the laser gas from said discharge tubes;

gas inlet pipes providing a circulation route to supply the laser gas to said discharge tubes;

connecting tubes connecting with said discharge tubes, said mirrors disposed in said connecting tubes;

housings covering an exterior of said connecting tubes;

sensors detecting electromagnetic waves generated by micro discharge current flowing in said connecting tubes; and said control circuit controlling the energy from said power supplies to said discharge tubes based on said output signals from said sensors.

19. The gas laser oscillator as set forth in claim 1 comprising:

one or more of said discharge tubes being insulator discharge tubes;

a plurality of pairs of electrodes, each pair including an anode and a cathode disposed at opposite ends of said discharge tubes;

high-voltage direct current power supplies supplying high voltages to said pairs of electrodes;

said mirrors including a total reflection mirror and a partial reflection mirror, said partial reflection mirror being an output mirror;

a blower axially circulating laser gas in said discharge tubes;

heat exchangers for cooling the laser gas;

a gas output pipe providing a circulating route to exhaust the laser gas from said discharge tubes;

gas inlet pipes providing a circulating route to supply the laser gas to said discharge tube;

connecting tubes connecting with said discharge tubes, said mirrors disposed in said connecting tubes;

detection electrodes for conducting current from a the micro discharge current flowing near said mirrors;

current detectors disposed between said electrodes and a ground potential; and said control circuit controlling the energy from said power supplies to said discharge tubes based on said output signals from said current detectors.

20. The gas laser oscillator as set forth in claim 19, wherein said current detectors are resistors or current transformers.

21. The gas laser oscillator as set forth in claim 1 comprising:

one or more of said discharge tubes being insulator discharge tubes;

an anode and a cathode disposed at opposite ends of said discharge tubes;

high-voltage direct current power supply providing high voltages to said anode and cathode;

said mirrors including a total reflection mirror and a partial reflection mirror, said partial reflection mirror being an output mirror;

a blower axially circulating laser gas in said discharge tubes;

heat exchangers for cooling the laser gas;

a gas outlet pipe providing a circulation route to exhaust the laser gas from said discharge tubes;

gas inlet pipes providing a circulation route to supply the laser gas to said discharge tubes;

connecting tubes connecting with said discharge tubes, said mirrors disposed in said connecting tubes;

optical sensors detecting light generated by the micro discharge current flowing near the mirrors in said connecting tubes;

said control circuit controlling the energy from said power supplies to said discharge tubes based on said output signals from said optical sensors.

22. The gas laser oscillator as set forth in claim 21, wherein said optical sensors are PIN photo diodes.

23. The gas laser oscillator as set forth in claim 1 comprising:

one or more of said discharge tubes being insulator discharge tubes;

a plurality of pairs of electrodes, each pair including an anode and a cathode disposed at opposite ends of said discharge tubes;

high-voltage direct current power supplies supplying high voltages to said pairs of electrodes;

said mirrors including a total reflection mirror and a partial reflection mirror, said partial reflection mirror being an output mirror;

a blower axially circulating laser gas in said discharge tubes;

heat exchangers for cooling the laser gas;

a gas output pipe providing a circulation route to exhaust the laser gas from said discharge tubes;

gas inlet pipes are made of an insulator, said gas inlet pipes providing a circulation route to supply the laser gas to said discharge tubes;

connecting tubes connecting with said discharge tubes, said mirrors disposed in said connecting tubes;

housings covering an exterior of said connecting tubes;

high frequency power supplies for generating high frequency signals;

coaxial cables transmitting the high frequency signals from said high frequency power supplies to said housings;

reflected wave detectors for detecting reflected waves returning from said housings to said high frequency power supplies via said coaxial cables; and said control circuit controlling the energy from said power supplies to said discharge tubes based on said output signals from said reflected wave detectors.

24. The gas laser oscillator as set forth in claim 1 comprising:

one or more of said discharge tubes being insulator discharge tubes;

a plurality of pairs of electrodes, each including an anode and a cathode disposed at opposite ends of said discharge tubes;

high-voltage direct current power supplies providing high voltages to said pairs of electrodes;

said mirrors including a total reflection mirror and a partial reflection mirror, said partial reflection mirror being an output mirror;

a blower for axially circulating laser gas in said discharge tubes;

heat exchangers cooling the laser gas;

a gas output pipe providing a circulation route to exhaust the laser gas from said discharge tubes;

gas inlet pipes providing a circulation route to supply the laser gas to said discharge tubes;

connecting tubes connecting with said discharge tubes, said mirrors disposed in said connecting tubes;

said control circuit controlling the energy from said power supplies to said discharge tubes by being responsive to an integrated value, said integrated value obtained by integrating said output signal.

25. The gas laser oscillator as set forth in claim 1 comprising:

one or more of said discharge tubes being insulator discharge tubes;

a plurality of pairs of electrodes, each including an anode and a cathode disposed at opposite ends of said discharge tubes;

high-voltage direct current power supplies supplying high voltages to said pairs of electrodes;

said mirrors including a total reflection mirror and a partial reflection mirror, said partial mirror being an output mirror;

a blower axially circulating laser gas in said discharge tubes;

heat exchangers for cooling the laser gas;

a gas output pipe made of an insulator, said gas output pipe providing a circulation route to exhaust the laser gas from said discharge tubes;

gas inlet pipes made of an insulator, said gas inlet pipes providing a circulation route to supply the laser gas to said discharge tubes;

connecting tubes connecting with said discharge tubes, said mirrors disposed in said connecting tubes;

said control circuit controlling the energy from said power supplies to said discharge tubes by being responsive to a sum, said sum obtained by summing, for a predetermined period, a number of occurrences of micro discharge current flowing in said connecting tubes.

* * * * *